(12) United States Patent
Engebretsen et al.

(10) Patent No.: US 8,843,688 B2
(45) Date of Patent: Sep. 23, 2014

(54) CONCURRENT REPAIR OF PCIE SWITCH UNITS IN A TIGHTLY-COUPLED, MULTI-SWITCH, MULTI-ADAPTER, MULTI-HOST DISTRIBUTED SYSTEM

(75) Inventors: David R. Engebretsen, Cannon Falls, MN (US); Brian G. Holthaus, Oronoco, MN (US); Jonathan L. Kaus, Rochester, MN (US); Eric G. Thiemann, Owatonna, MN (US); Robert W. Todd, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 13/609,561

(22) Filed: Sep. 11, 2012

(65) Prior Publication Data

US 2014/0075068 A1 Mar. 13, 2014

(51) Int. Cl.
G06F 13/40 (2006.01)
G06F 9/44 (2006.01)
G06F 13/42 (2006.01)

(52) U.S. Cl.
CPC .......... *G06F 13/4022* (2013.01); *G06F 9/4411* (2013.01); *G06F 13/4221* (2013.01)
USPC ............ 710/316; 710/104; 710/106; 710/313

(58) Field of Classification Search
CPC .............. G06F 13/4022; G06F 13/387; G06F 13/4221; G06F 9/4411; G06F 9/4413
USPC .......................................................... 710/106
See application file for complete search history.

(56) References Cited

U.S. PATENT DOCUMENTS

| | | | |
|---|---|---|---|
| 7,058,738 B2* | 6/2006 | Stufflebeam, Jr. ............ | 710/104 |
| 7,152,136 B1 | 12/2006 | Charagulla | |
| 7,334,071 B2* | 2/2008 | Onufryk et al. ............... | 710/312 |
| 7,478,178 B2* | 1/2009 | Torudbakken et al. ......... | 710/31 |
| 7,519,761 B2* | 4/2009 | Gregg ........................... | 710/316 |
| 7,783,818 B1* | 8/2010 | Sardella et al. ............... | 710/313 |
| 7,925,817 B2* | 4/2011 | Uehara et al. ................ | 710/316 |
| 7,979,621 B2* | 7/2011 | Gregg ........................... | 710/316 |
| 8,285,911 B2* | 10/2012 | Itakura .......................... | 710/314 |
| 8,407,391 B2* | 3/2013 | Uehara et al. ................ | 710/316 |
| 8,417,865 B2* | 4/2013 | Higuchi et al. ............... | 710/313 |
| 8,423,698 B2* | 4/2013 | Matthews et al. ............. | 710/311 |
| 8,626,976 B2* | 1/2014 | Matthews et al. ............. | 710/313 |
| 8,719,483 B2* | 5/2014 | Hidaka ......................... | 710/314 |
| 8,725,926 B2* | 5/2014 | Baba et al. .................... | 710/316 |
| 2005/0246460 A1* | 11/2005 | Stufflebeam, Jr. ............ | 710/104 |
| 2006/0168377 A1 | 7/2006 | Vasudevan et al. | |
| 2006/0242353 A1* | 10/2006 | Torudbakken et al. ....... | 710/316 |
| 2006/0282603 A1* | 12/2006 | Onufryk et al. ............... | 710/312 |
| 2008/0086584 A1* | 4/2008 | Gregg ........................... | 710/316 |
| 2009/0265501 A1* | 10/2009 | Uehara et al. ................ | 710/312 |
| 2010/0211717 A1* | 8/2010 | Uehara et al. ................ | 710/316 |

(Continued)

*Primary Examiner* — Ryan Stiglic
(74) *Attorney, Agent, or Firm* — Patterson & Sheridan, LLP

(57) ABSTRACT

Techniques are disclosed to perform an operation to facilitate concurrent repair of PCIe switch units in processing environments such as a tightly coupled, multi-switch, multi-adapter, multi-host distributed system. The operation, for an identified switch unit to be repaired, reconfigures all switch unit hardware in the switch fabric by removing all upstream to downstream connections utilizing the identified switch unit. Connections to hosts via the upstream ports are also removed by the operation. Once the switch unit is powered back on, the operation reconfigures all switch unit hardware in the switch fabric by adding all upstream to downstream connections utilizing the identified switch unit. The operation further restores connections to hosts via the upstream ports.

13 Claims, 8 Drawing Sheets

(56) References Cited

U.S. PATENT DOCUMENTS

| | | | |
|---|---|---|---|
| 2010/0312943 A1* | 12/2010 | Uehara et al. | 710/316 |
| 2011/0131361 A1* | 6/2011 | Itakura | 710/313 |
| 2011/0167189 A1* | 7/2011 | Matsubara et al. | 710/308 |
| 2011/0185163 A1 | 7/2011 | Hidaka | |
| 2011/0225341 A1* | 9/2011 | Satoh et al. | 710/314 |
| 2012/0059966 A1* | 3/2012 | Tanaka et al. | 710/313 |
| 2012/0297107 A1* | 11/2012 | Mathew et al. | 710/313 |
| 2013/0111082 A1* | 5/2013 | Baba et al. | 710/38 |

* cited by examiner

US 8,843,688 B2

CONCURRENT REPAIR OF PCIE SWITCH UNITS IN A TIGHTLY-COUPLED, MULTI-SWITCH, MULTI-ADAPTER, MULTI-HOST DISTRIBUTED SYSTEM

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch

SUMMARY

Embodiments disclosed herein provide a computer-implemented method, computer program product, and system to perform an operation to repair switch units in a distributed switch having a plurality of switch units, each switch unit of the plurality having at least one port for establishing connections according to a predefined interface. The operation, responsive to receiving an indication to vary off a first switch unit of the plurality of switch units, identifies a host connected to the first switch unit, transmits a first removal indication to the host to remove a connection between the host and the first switch unit, and upon determining that: (i) the host is connected to the first switch unit through a downstream port of the first switch unit and (ii) the host has not acknowledged the first removal indication within a predefined amount of time, transmits a second removal indication, the second removal indication emulating that the first switch unit is physically removed from the distributed switch, where the first switch unit is not physically removed from the distributed switch. The operation then, responsive to receiving an indication to vary on the first switch unit, transmits an add indication to the host to establish a connection between the host and the first switch unit.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
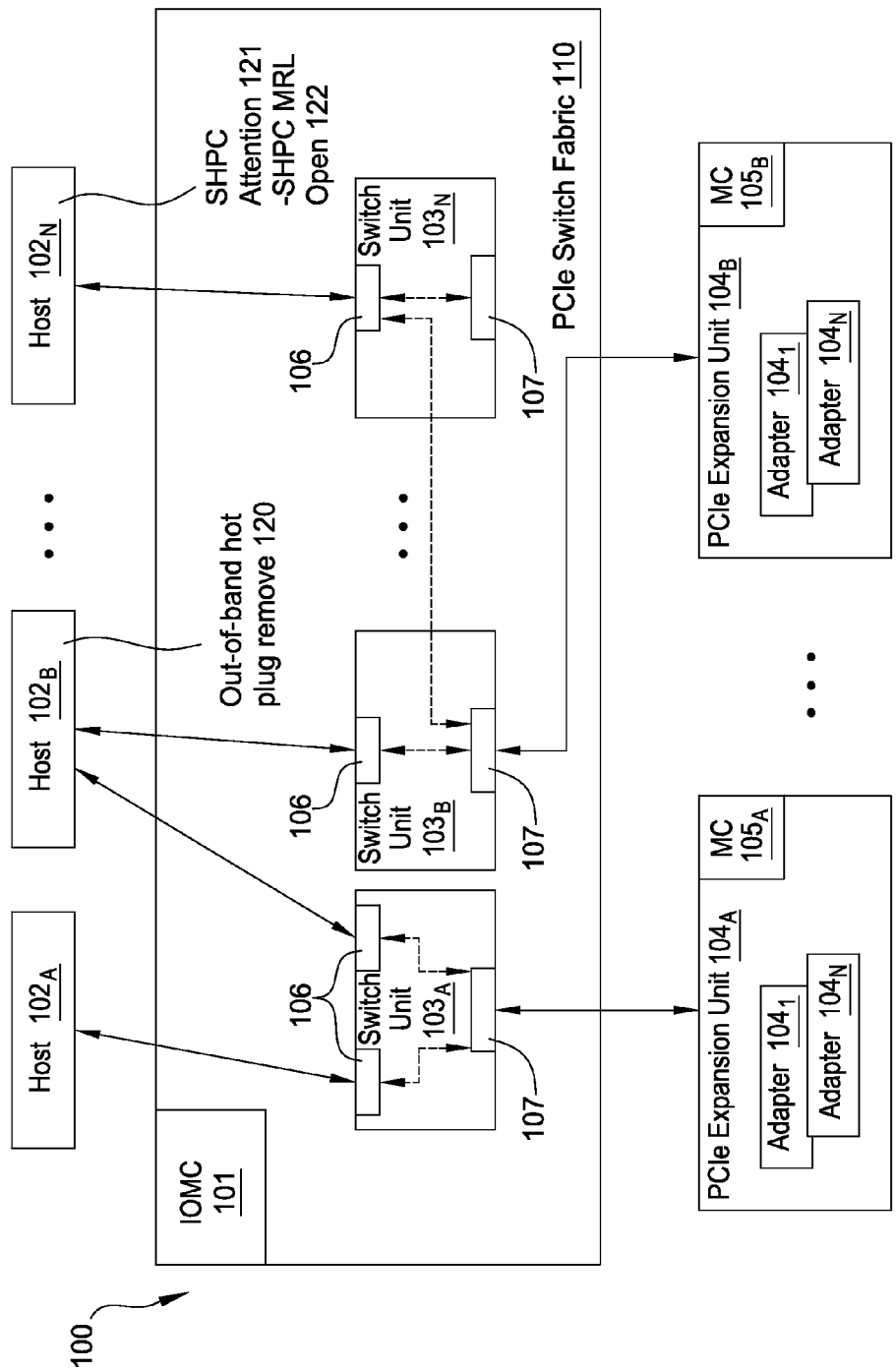
FIGS. 1A-1C are schematics illustrating techniques for concurrent repair of PCIe switch units in a tightly-coupled, multi-switch, multi-adapter, multi-host distributed system, according to one embodiment disclosed herein.

Embodiments disclosed herein provide a computer-implemented method, computer program product, and system to perform an operation to repair switch units in a distributed switch having a multiple switch units. Each switch unit has at least one port for establishing connections according to a predefined interface. The operation includes receiving an indication to vary off a first switch unit, identifies a host connected to the first switch unit. The operation further includes transmitting a first removal indication to the host to remove a connection between the host and the first switch unit. The operation further includes transmitting a second removal indication upon determining that: (i) the host is connected to the first switch unit through a downstream port of the first switch unit and (ii) the host has not acknowledged the first removal indication within a predefined amount of time. The second removal indication emulates that the first switch unit is physically removed from the distributed switch, even though the first switch unit is not actually physically removed from the distributed switch. The operation further includes, responsive to receiving an indication to vary on the first switch unit, transmitting an add indication to the host to establish a connection between the host and the first switch unit.

Switch units, such as Peripheral Component Interconnect Express (PCIe) components, may be concurrently repaired in a single-system, single host-bridge configuration by an operating system or by a designated application. Embodiments that integrate many distinct (and many more virtual) host, switch, and I/O expansion elements into a single tightly coupled system present new challenges for PCIe system design. When a PCIe switch unit is removed from such a distributed switch system, certain elements of the system need to be notified and hardware must be reconfigured. These steps must be performed in a specific order and with specific methods to avoid service disruption. Generally, embodiments described herein utilize a fabric scope management controller to orchestrate a set of predefined control flows which use existing "in-band" and "out-of-band" hot plug mechanisms to facilitate switch unit concurrent repair. As used herein, "in-band" refers to communications using PCI communication channels and specifications, such as the PCI standard hot plug control (SHPC) specification. As used herein, "out-of-band" refers to communication channels outside of PCI specifications, as, in many instances, there may be no active PCI communication channels between hardware components. In one embodiment, the "out-of-band" hot plug mechanisms are implemented using an Integrated Management Module (IMM) which uses the Intelligent Platform Management Interface (IPMI). The out-of-band interface may be used to notify a host in the case of an insertion as well as a removal of system hardware. Each host unit in the distributed switch has an IMM, which is used by the distributed switch hardware to communicate with the operating system of the host, so the host knows a switch element is going to be removed. Regardless of the protocol used, by alerting the host to the impending removal of the switch unit, the host can properly reconfigure itself so its operating system will not crash.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic 100 illustrating techniques for concurrent repair of PCIe switch units in a tightly-coupled, multi-switch, multi-adapter, multi-host distributed system, according to one embodiment disclosed herein. As illustrated, the schematic 100 includes a PCIe switch fabric 110 in which a plurality of switch units $103_{A-N}$ are connected. In one embodiment, the switch units $103_{A-N}$ are PCIe switch units. The switch units $103_{A-N}$ connect a plurality of hosts $102_{A-N}$ to a plurality of PCIe expansion units $104_{A-B}$. Each PCIe expansion unit $104_{A-B}$ is controlled by a management controller $105_{A-B}$ and includes a plurality of PCIe adapters $104_{1-N}$. Each switch unit $103_{A-N}$ includes at least one upstream port 106 providing a link (shown as the solid arrows) to the hosts $102_{A-N}$ and at least one downstream port 107 providing a link (shown as the solid arrows) to the PCIe expansion units $104_{A-B}$. Each upstream port 106 and downstream port 107 of a respective switch unit $103_{A-N}$ may be connected, as indicated by the dashed arrows. Furthermore, an upstream port 106 of one switch unit may be connected to a downstream port 107 of another switch unit. For example, the dashed arrow indicates a connection between the upstream port 106 of switch unit $103_N$ to the downstream port 107 of switch unit $103_B$. Although each switch unit $103_{A-N}$ is shown as including at least one upstream port and at least one downstream port, in other embodiments, a switch unit $103_{A-N}$ may include one or more upstream ports, and no downstream ports. In still other embodiments, a switch unit $103_{A-N}$ may include one or more downstream ports, and no upstream ports.

In one embodiment, when a switch unit needs to be removed or repaired, the hosts, PCIe expansion units, and/or other switch units in the switch fabric are notified of the impending unavailability of the switch unit in order to prevent system errors. For example, if the switch unit $103_B$ is removed from the switch fabric 110, switch unit $103_N$ will no longer have a connection to PCIe expansion unit $103_B$ and host $102_B$. The host $102_N$ is therefore alerted of the impending removal of switch unit $103_B$ such that the host $102_N$ does not attempt route data through switch unit $103_B$ after it is removed.

In one embodiment, in order to facilitate the concurrent repair of switch units, the Input/Output Management Controller (IOMC) 101 may orchestrate a set of defined control flows. If, for example, the switch unit $103_B$ needs to be repaired and will be temporarily unavailable, a vary off procedure begins. To begin the procedure to vary off the switch unit $103_B$, the IOMC may cause the switch unit $103_B$ to cycle through its upstream ports 106 to identify any hosts, such as host $102_B$ that are powered on. Upon detecting the host $102_B$, an "out-of band" hot plug remove command 120 may be sent by the IOMC 101 to the host $102_B$, which alerts the host $102_B$ that the switch unit $103_B$ is going away for a period of time. The IOMC 101 may wait for an acknowledgement from the host $102_B$. If an acknowledgement is not received within a predefined amount of time, the IOMC 101 may abort the process of varying off the switch unit $103_B$. If, however, a force indication has been set, the lack of an acknowledgement from the host $102_B$ will not abort the vary off procedure, and the repair process will continue.

Additionally, in some embodiments, the IOMC 101 may cause the switch unit $103_B$ to cycle through each of its downstream ports. The IOMC 101 may cause an "in-band" (using PCIe specifications) hot plug remove event of the downstream port to be communicated to all upstream ports that are connected to this downstream port. In one embodiment, the in-band hot plug remove event is a PCIe standard hot plug controller (SHPC) attention command. An SHPC attention command, which is issued when a switch unit is being removed, is used to communicate to the host to that effect (i.e., that the switch unit is being removed), to instruct the host should stop sending traffic to the switch unit in preparation for its removal. As illustrated, an SHPC attention command 121 is being transmitted to the host $102_N$. Hosts that do not acknowledge the hot remove request will cause the IOMC 101 to abort the vary off (and repair) procedure—unless the force option has been specified. If the host $102_N$ does not respond with an acknowledgement within a predefined amount of time (or the force option is set), an SHPC manual retention latch (MRL) open command 122 may be issued to the host $102_N$. An MRL is used to secure a PCIe device to the switch fabric 110; an "open" command from an MRL sensor indicates that the latch has been open, and the switch unit removed. However, the MRL open command 122 sent to host $102_N$ is not sent in response to removing the switch unit $103_B$, as the command may indicate. Instead it is used as a way to emulate to the host $102_N$ that the switch unit $103_B$ has been removed from the switch fabric 110. By operating in such a fashion, the switch unit hardware in the switch fabric 110 is reconfigured such that all upstream to downstream connections utilizing switch unit $103_B$ are removed.

Figure 1B:
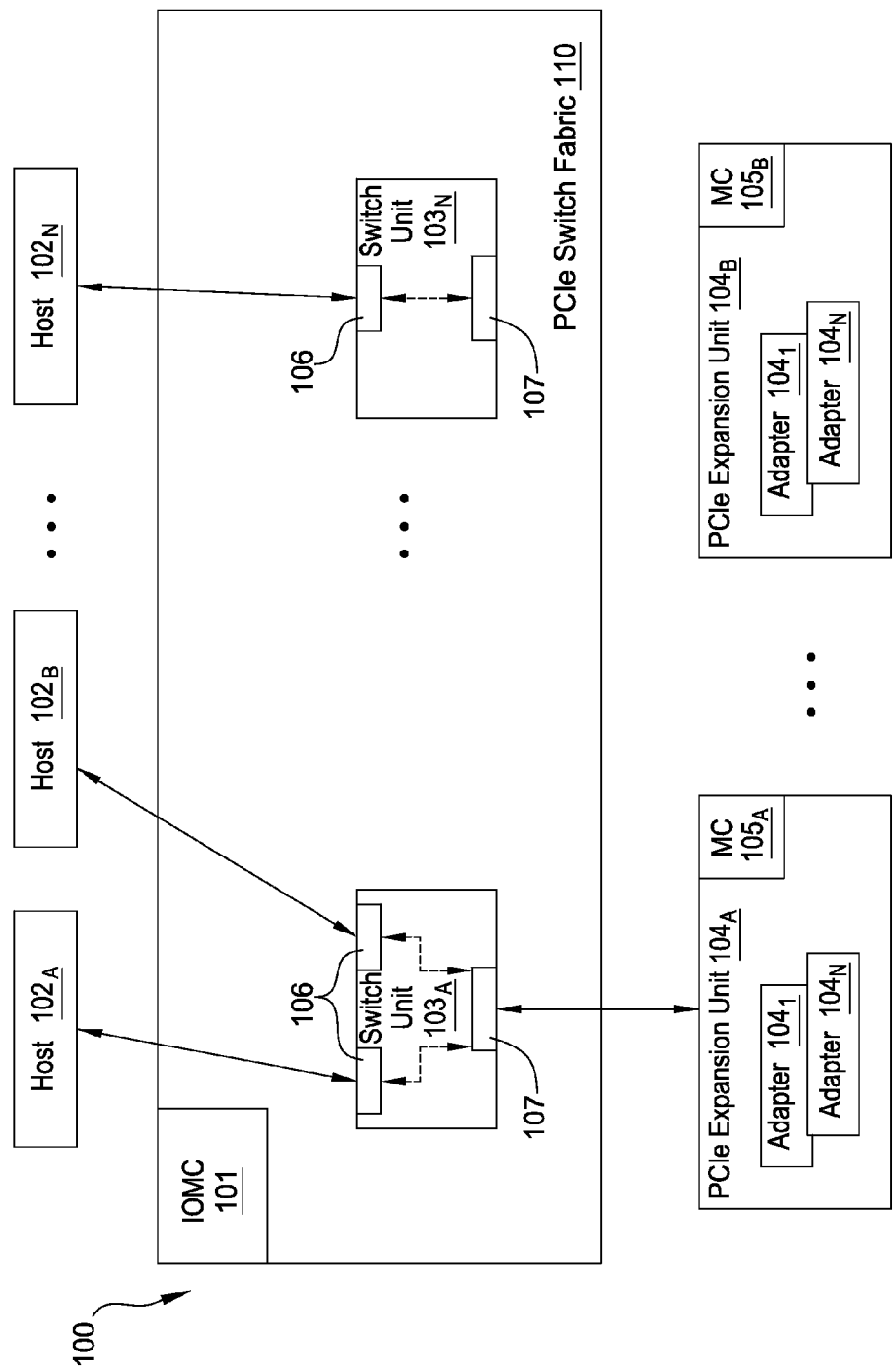

FIG. 1B illustrates the status of the schematic 100 as a result of performing the vary off operations depicted in FIG. 1A. As shown, the switch unit $103_B$ has been "removed" from the fabric as far as the rest of the hardware is concerned. In reality, the switch unit $103_B$ may still remain plugged in to the PCIe switch fabric 110, but the SHPC MRL open command has caused the other hardware elements to think that switch unit $103_B$ is gone. Also, the connections between the downstream port 107 of the switch unit $103_B$ and the upstream port of the switch unit $103_N$ have been removed. Also removed are the connections between the switch unit $103_B$ and host $102_B$ and the switch unit $103_B$ PCIe expansion unit $104_B$. Once the switch unit $103_B$ is powered back on, the IOMC 101 may cause a series of commands to vary on the switch unit $103_B$ such that it is properly reincorporated to the PCIe switch fabric 110.

Figure 1C:
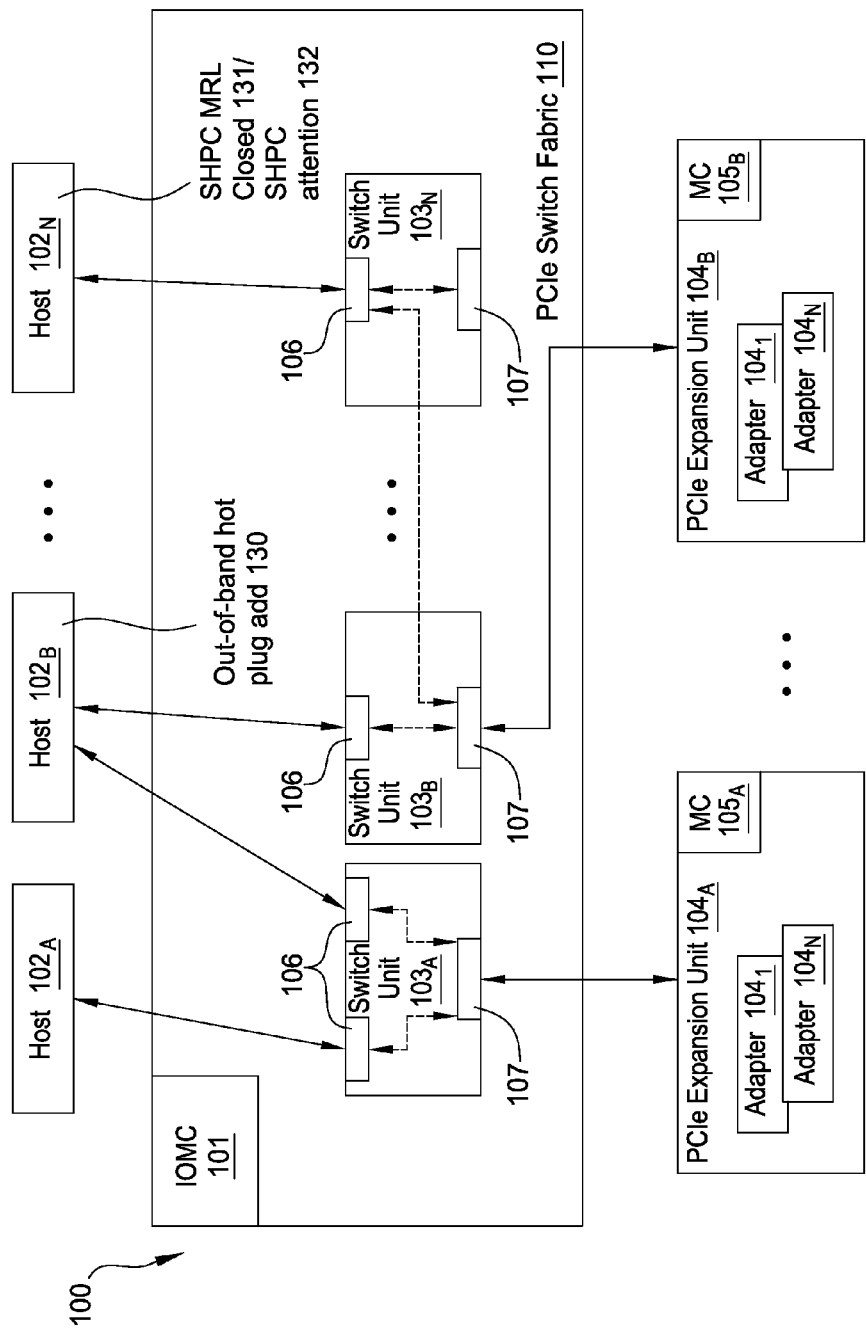

FIG. 1C is a schematic illustrating techniques for varying on a PCIe switch unit, according to one embodiment disclosed herein. The IOMC 101 may trigger a cycling through the downstream ports of the switch unit $103_B$ and indicate an immediate downstream port add command. In one embodiment, the downstream port add command is the SHPC MRL closed command 131, which emulates to the host that the optical latch has closed and that a switch unit has been added to the switch fabric 110. For all upstream ports connected to each downstream port of the switch unit $103_B$, an in-band (PCIe) hot plug add event is indicated. In one embodiment, the in-band hot plug add event is the SHPC attention command 132. The SHPC attention command 132 may be used to indicate to the host that a downstream port has been added, and that the host, in response, should scan it to establish a connection. Finally, the IOMC 101 may cause the switch unit $103_B$ to cycle through each of its upstream ports 106. For each host connected to the switch unit $103_B$ through the upstream port 106, an out-of-band hot plug add command 130 is sent, to indicate that the switch unit $103_B$ has been added. By operating in such a fashion, the IOMC 101 reconfigures all switch unit hardware in the switch fabric 101 by adding all upstream to downstream connections utilizing the repaired switch unit $103_B$.

Figure 2:
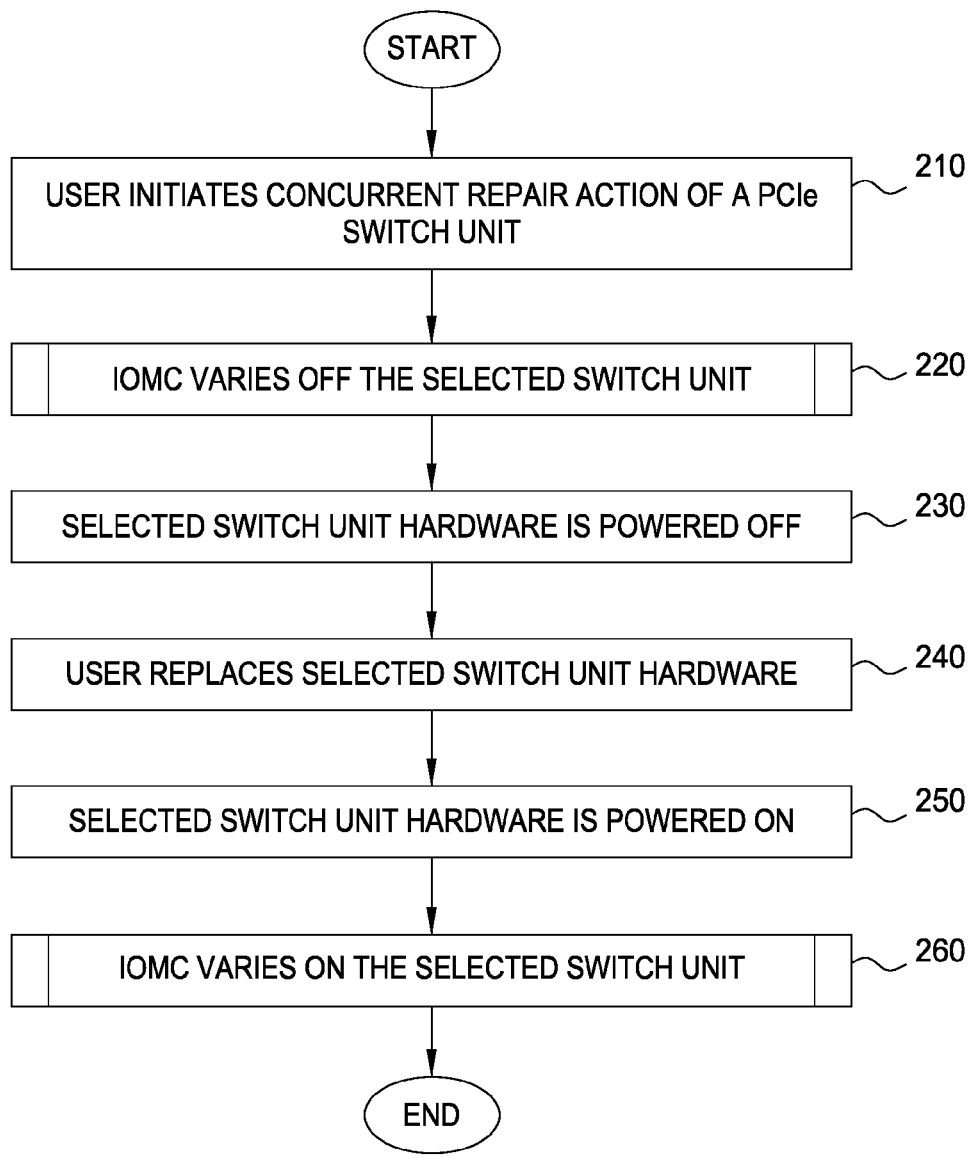
FIG. 2 is a flowchart depicting a method for concurrent repair of PCIe switch units in a tightly-coupled, multi-switch, multi-adapter, multi-host distributed system, according to one embodiment disclosed herein.

FIG. 2 is a flowchart depicting a method 200 for concurrent repair of PCIe switch units in a tightly-coupled, multi-switch, multi-adapter, multi-host distributed system, according to one embodiment disclosed herein. The method 200 generally provides a set of control flows that facilitate the concurrent repair of a PCIe switch unit. For example, a particular PCIe switch unit may not be functioning, which may require that the user vary off the switch unit, replace the switch unit hardware, and vary it back on. At step 210, a user initiates a repair action of a particular PCIe switch unit. The switch unit may be repaired for any number of reasons, including but not limited to a total failure in the switch unit, or that a number of ports are not operating. At step 220, the IOMC varies off the selected switch unit to allow for its removal from the switch fabric. Varying off the switch unit is described in further detail in reference to FIG. 3. At step 230, the selected switch unit hardware is powered off. At step 240, the user may replace the selected switch unit hardware. The switch unit hardware may be replaced by the same switch unit that has been repaired or by a new switch unit configured to take the place of the replaced switch unit. At step 250, the switch unit hardware is powered on. At step 260, the IOMC varies on the switch unit hardware to incorporate the switch unit into the switch fabric.

Figure 3:
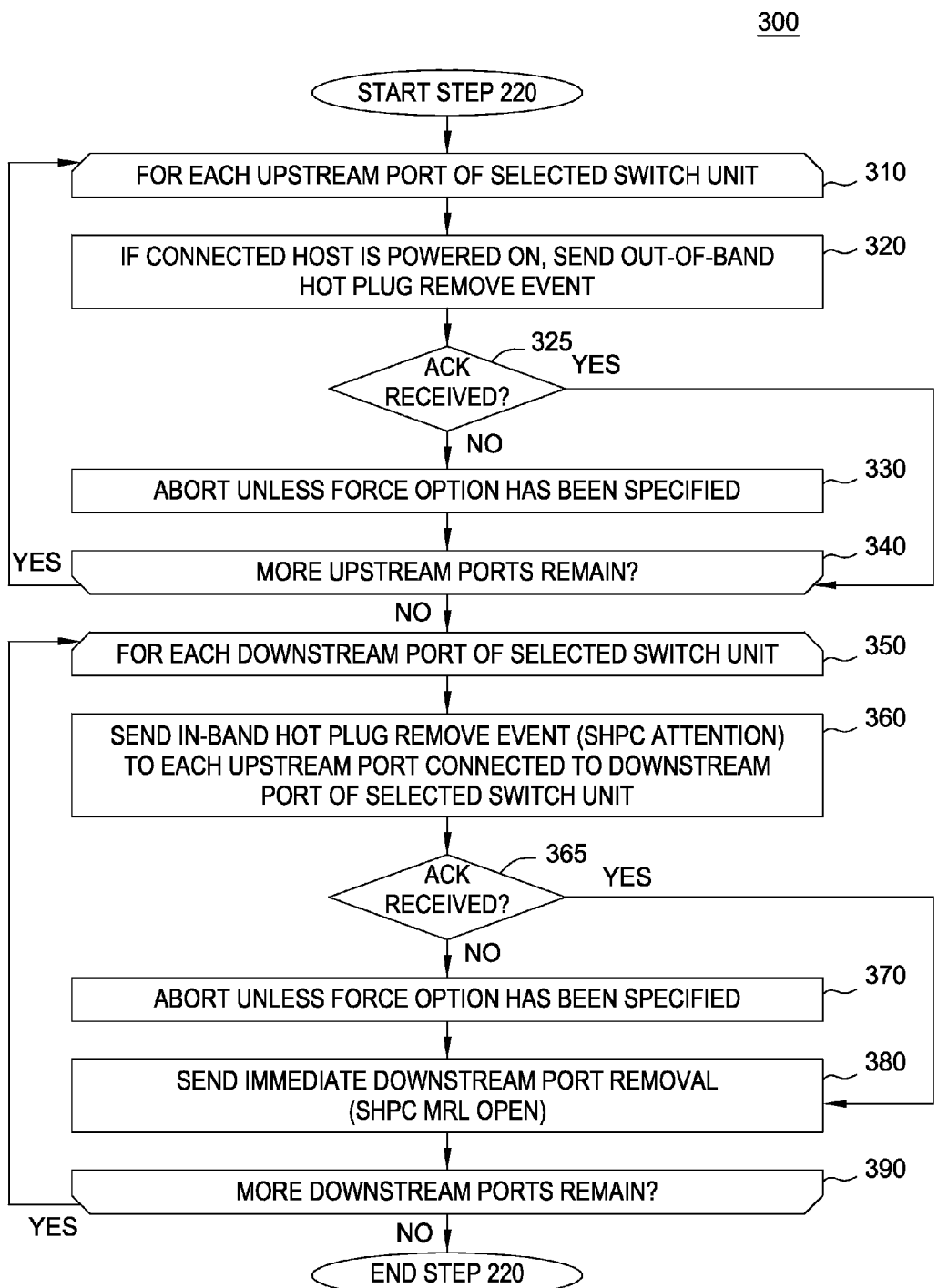
FIG. 3 is a flowchart depicting a method to vary off a PCIe switch unit, according to one embodiment disclosed herein.

FIG. 3 is a flowchart depicting a method 300 corresponding to step 220 to vary off a PCIe switch unit, according to one embodiment disclosed herein. In one embodiment, an IOMC performs the steps of the method 300. At step 310, a loop including steps 320-340 is executed to indicate the removal of the selected switch unit to hardware connected to each upstream port of the selected switch unit. At step 320, if a host connected to the current upstream port is powered on, an out-of-band hot plug remove event is sent by the IOMC to the host. In one embodiment, the out-of-band hot plug remove event is a message sent using the IPMI protocol to an IMM of the host. The hot plug remove event indicates that the switch unit is being removed from the switch fabric and that the host should act accordingly (for example, modify routing configurations). The IOMC is programmed to wait for an acknowledgement from the host, to be received within a predefined length of time. At step 325, the IOMC determines whether the acknowledgement was timely received. If the host acknowledged the command, the method proceeds to step 340. Otherwise, the method proceeds to step 330. At step 330, the IOMC aborts the vary off procedure unless a force option has been specified. The force option indicates that the vary off procedure should continue even though an acknowledgement has not been received. If the vary off procedure is aborted, the method 300 ends and the switch unit is not repaired. At step 340, the IOMC determines whether the switch to be repaired has more upstream ports to scan. If more upstream ports remain, the method returns to step 310. Otherwise, the method proceeds to step 350.

At step 350, a loop including steps 360-390 begins for each downstream port of the selected switch unit to indicate the removal of the selected switch unit to any upstream ports of other switch units connected to a downstream port of the selected switch unit. At step 360, the IOMC sends an in-band hot plug remove event to each upstream port connected to the downstream ports of the selected switch unit to indicate the removal of the selected switch unit. In one embodiment, the in-band hot plug remove event is a SHPC attention command using the PCI SHPC specification. The SHPC attention command indicates to the host that the downstream port is being removed and that the operating system of the host should therefore prepare the downstream port for removal by quiescing traffic going to the port. Hosts must acknowledge the SHPC attention event within a predefined amount of time. At step 365, the IOMC determines whether an acknowledgement has been received from the host connected to the upstream port. If an acknowledgement is received, the method proceeds to step 380; otherwise, the method proceeds to step 370.

At step 370, the IOMC aborts the vary off procedure unless a force option has been specified. The force option indicates that the vary off procedure should continue even though an acknowledgement has not been received. If the vary off procedure is aborted, the method 300 ends, and the switch unit is not repaired. At step 380, an immediate downstream port removal command is sent to the upstream powered-on hosts. In one embodiment, the port removal command is an in-band PCIe SHPC MRL open command, which emulates to the hosts that the optical latch of the switch unit has been opened and that the switch unit has been removed. However, the switch unit need not actually be removed, and the optical latch need not actually have been opened. Instead, the SHPC MRL open command is used to emulate to the switch hardware that the switch unit has been removed. At step 390, the IOMC determines whether more downstream ports remain. If more downstream ports remain to be scanned for powered-on upstream hosts, the method returns to step 350. Otherwise, the method 300 ends. By performing the steps of the method 300, the IOMC reconfigures all switch unit hardware in the switch fabric by removing all upstream to downstream connections utilizing the selected switch unit.

Figure 4:
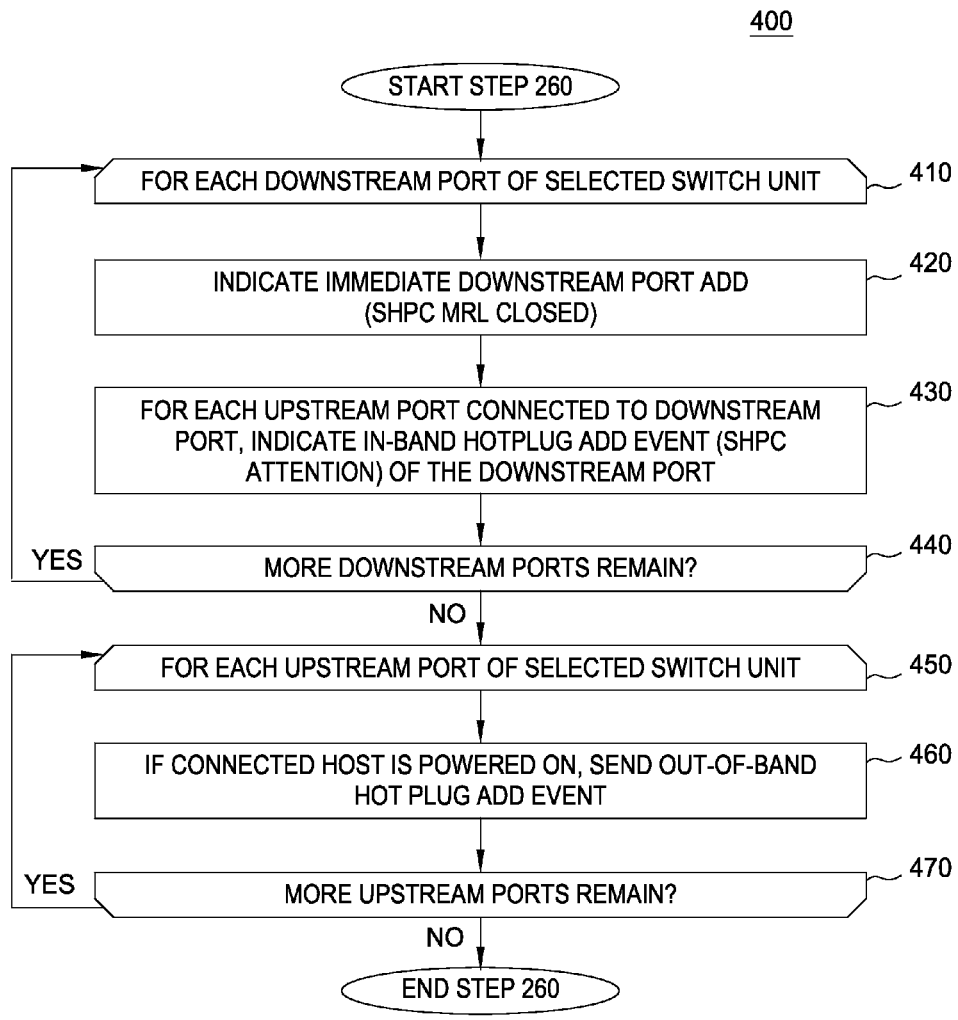
FIG. 4 is a flowchart depicting a method to vary on a PCIe switch unit, according to one embodiment disclosed herein.

FIG. 4 is a flowchart depicting a method 400 corresponding to step 260 to vary on a PCIe switch unit, according to one embodiment disclosed herein. By varying on the switch unit using the method 400, the switch unit may properly be assimilated into the switch fabric. In one embodiment, the IOMC performs the steps of the method 400. At step 410, a loop including steps 420-440 is executed for each downstream port of the selected switch unit. At step 420, an immediate downstream port add is indicated. In one embodiment, the downstream port add is an SHPC MRL closed command. The SHPC MRL closed command is used to emulate to the hosts that the selected switch unit has been added to the switch fabric. At step 430, for each upstream port connected to the downstream port, an in-band hot plug add of the downstream port is indicated to hosts connected to the upstream ports. In one embodiment, the in-band hot plug add event is an SHPC attention command, which communicates to the hosts that a downstream port has been added and that the host should scan it to establish a connection. At step 440, the IOMC determines whether additional downstream ports remain to be scanned for connections to upstream ports. If additional downstream ports remain, the method returns to step 410. Otherwise, the method proceeds to step 450.

At step 450, a loop including steps 460-470 is executed to detect hosts connected to each upstream port of the selected switch unit. At step 460, if the connected host is powered on, the IOMC sends an out-of-band hot plug add event to the host. The out-of-band hot plug add event indicates to the host that the switch unit has been added to the switch fabric. In one embodiment, the out-of-band hot plug add event is sent using an IPMI protocol to an IMM of the host. At step 470, the IOMC determines whether more upstream ports remain to be scanned for connected hosts. If more upstream ports remain, the method returns to step 450. Otherwise, the method 400 ends. By executing the steps of the method 400, the IOMC reconfigures all switch unit hardware in the switch fabric by adding all upstream to downstream connections utilizing the repaired switch unit.

Figure 5:
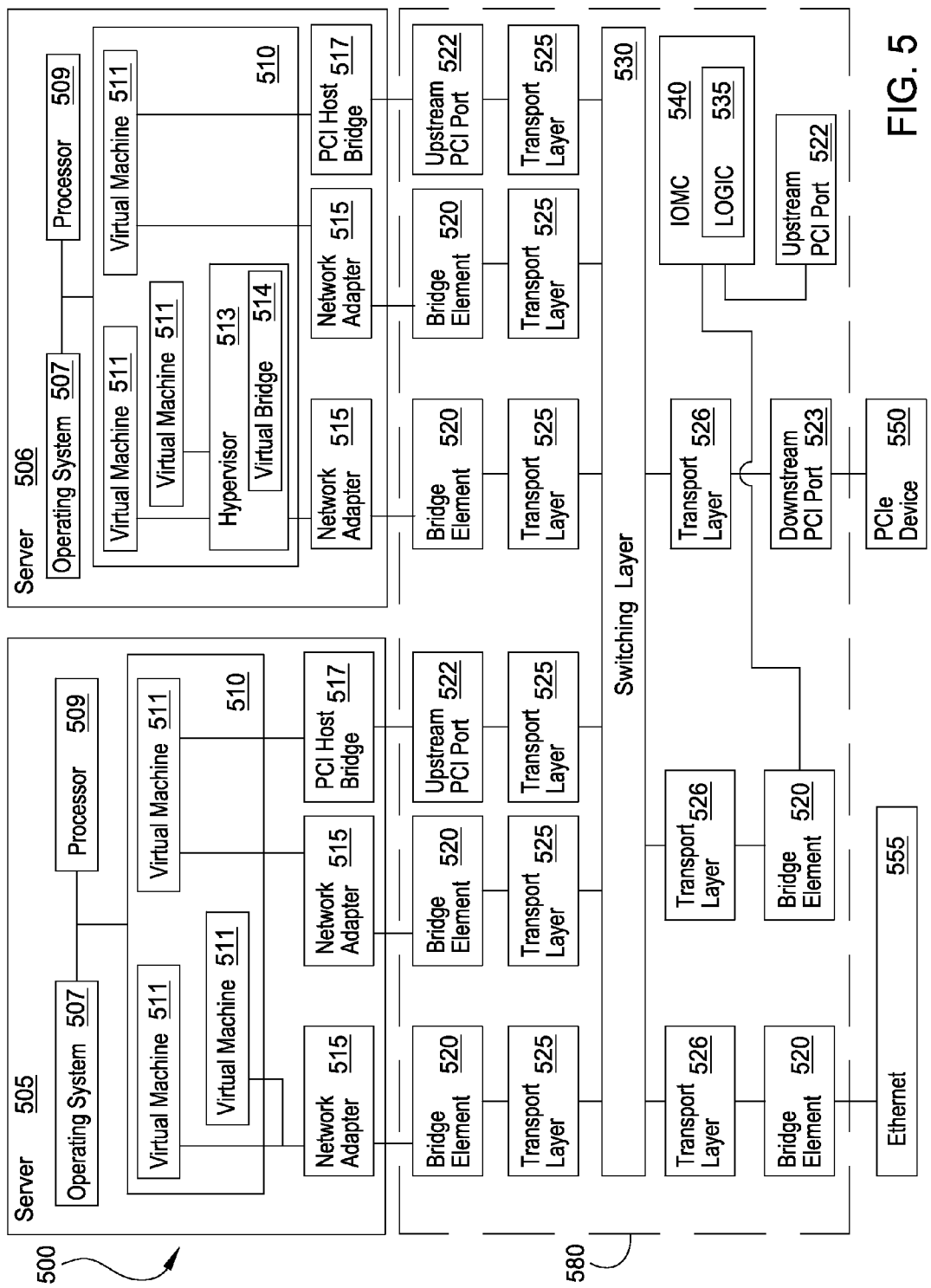
FIG. 5 illustrates a system architecture that includes a distributed, virtual switch, according to one embodiment described herein.

FIG. 5 illustrates a system architecture 500 that includes a distributed, virtual switch, according to one embodiment disclosed herein. The first server 505 may include at least one processor 509 coupled to a memory 510. The processor 509 may represent one or more processors (e.g., microprocessors) or multi-core processors. The memory 510 may represent random access memory (RAM) devices comprising the main storage of the server 505, as well as supplemental levels of memory, e.g., cache memories, non-volatile or backup memories (e.g., programmable or flash memories), read-only memories, and the like. In addition, the memory 510 may be considered to include memory storage physically located in the server 505 or on another computing device coupled to the server 505.

The server 505 may operate under the control of an operating system 507 and may execute various computer software applications, components, programs, objects, modules, and data structures, such as virtual machines 511.

The server 505 may include network adapters 515 (e.g., converged network adapters). A converged network adapter may include single root I/O virtualization (SR-IOV) adapters such as a Peripheral Component Interconnect Express (PCIe) adapter that supports Converged Enhanced Ethernet (CEE).

Another embodiment of the system 500 may include a multi-root I/O virtualization (MR-IOV) adapter. The network adapters 515 may further be used to implement of Fiber Channel over Ethernet (FCoE) protocol, RDMA over Ethernet, Internet small computer system interface (iSCSI), and the like. In general, a network adapter 515 transfers data using an Ethernet or PCI based communication method and may be coupled to one or more of the virtual machines 511. Additionally, the adapters may facilitate shared access between the virtual machines 511. While the adapters 515 are shown as being included within the server 505, in other embodiments, the adapters may be physically distinct devices that are separate from the server 505.

In one embodiment, each network adapter 515 may include a converged adapter virtual bridge (not shown) that facilitates data transfer between the adapters 515 by coordinating access to the virtual machines 511. Each converged adapter virtual bridge may recognize data flowing within its domain (i.e., addressable space). A recognized domain address may be routed directly without transmitting the data outside of the domain of the particular converged adapter virtual bridge.

Each network adapter 515 may include one or more Ethernet ports that couple to one of the bridge elements 520. Additionally, to facilitate PCIe communication, the server may have a PCI Host Bridge 517. The PCI Host Bridge 517 would then connect to an upstream PCI port 522 on a switch element in the distributed switch 580. The data is then routed via the switching layer 530 to the correct downstream PCI port 523 which may be located on the same or different switch module as the upstream PCI port 522. The data may then be forwarded to the PCI device 550.

The bridge elements 520 may be configured to forward data frames throughout the distributed virtual switch 580. For example, a network adapter 515 and bridge element 520 may be connected using two 40 Gbit Ethernet connections or one 100 Gbit Ethernet connection. The bridge elements 520 forward the data frames received by the network adapter 515 to the switching layer 530. The bridge elements 520 may include a lookup table that stores address data used to forward the received data frames. For example, the bridge elements 520 may compare address data associated with a received data frame to the address data stored within the lookup table. Thus, the network adapters 515 do not need to know the network topology of the distributed switch 580.

The distributed virtual switch 580, in general, includes a plurality of bridge elements 520 that may be located on a plurality of a separate, though interconnected, hardware components. To the perspective of the network adapters 515, the switch 580 acts like one single switch even though the switch 580 may be composed of multiple switches that are physically located on different components. Distributing the switch 580 provides redundancy in case of failure.

Each of the bridge elements 520 may be connected to one or more transport layer modules 525 that translate received data frames to the protocol used by the switching layer 530. For example, the transport layer modules 525 may translate data received using either an Ethernet or PCI communication method to a generic data type (i.e., a cell) that is transmitted via the switching layer 530 (i.e., a cell fabric). Thus, the switch modules comprising the switch 580 are compatible with at least two different communication protocols—e.g., the Ethernet and PCIe communication standards. That is, at least one switch module has the necessary logic to transfer different types of data on the same switching layer 530.

Each server 505, 506 has an encoding logic 535 at its respective ingress and egress ports, which is used to encode raw data streams. A single encoding logic 535 is depicted on each server for the sake of clarity. Although not shown, the encoding logic 535 includes an LFSR and a hold register, as well logic capable of performing the techniques described above. Generally, when IDLE or fixed data is received by the encoding logic 535, it is encoded using the techniques described above, namely by encoding a first raw data segment using a first LFSR PRBS, then encoding a second segment of raw data using the inverted LFSR PRBS.

Although not shown in FIG. 5, in one embodiment, the switching layer 530 may comprise a local rack interconnect with dedicated connections which connect bridge elements 520 located within the same chassis and rack, as well as links for connecting to bridge elements 520 in other chassis and racks.

After routing the cells, the switching layer 530 may communicate with transport layer modules 526 that translate the cells back to data frames that correspond to their respective communication protocols. A portion of the bridge elements 520 may facilitate communication with an Ethernet network 555 which provides access to a LAN or WAN (e.g., the Internet). Moreover, PCI data may be routed to a downstream PCI port 523 that connects to a PCIe device 550. The PCIe device 550 may be a passive backplane interconnect, as an expansion card interface for add-in boards, or common storage that can be accessed by any of the servers connected to the switch 580.

Although "upstream" and "downstream" are used to describe the PCI ports, this is only used to illustrate one possible data flow. For example, the downstream PCI port 523 may in one embodiment transmit data from the connected to the PCIe device 550 to the upstream PCI port 522. Thus, the PCI ports 522, 523 may both transmit as well as receive data.

A second server 506 may include a processor 509 connected to an operating system 507 and memory 510 which includes one or more virtual machines 511 similar to those found in the first server 505. The memory 510 of server 506 also includes a hypervisor 513 with a virtual bridge 514. The hypervisor 513 manages data shared between different virtual machines 511. Specifically, the virtual bridge 514 allows direct communication between connected virtual machines 511 rather than requiring the virtual machines 511 to use the bridge elements 520 or switching layer 530 to transmit data to other virtual machines 511 communicatively coupled to the hypervisor 513.

An Input/Output Management Controller (IOMC) 540 (i.e., a special-purpose processor) is coupled to at least one bridge element 520 or upstream PCI port 522 which provides the IOMC 540 with access to the switching layer 530. One function of the IOMC 540 may be to receive commands from an administrator to configure the different hardware elements of the distributed virtual switch 580. In one embodiment, these commands may be received from a separate switching network from the switching layer 530. As shown, the IOMC 540 has logic 535 which is used to orchestrate the concurrent repair of PCIe switch units in the distributed switch. Generally, the logic 535 causes the IOMC 540 to perform the above-described operations to vary off and vary on switch units selected for repairs. In one embodiment, the operations may specify to vary on and off a switch unit from a separate switching layer from the switching layer 530.

Although one IOMC 540 is shown, the system 500 may include a plurality of IOMCs 540. In one embodiment, these IOMCs 540 may be arranged in a hierarchy such that one IOMC 540 is chosen as a master while the others are delegated as members (or slaves). Furthermore, in one embodiment, each IOMC may have a logic 535.

Figure 6:
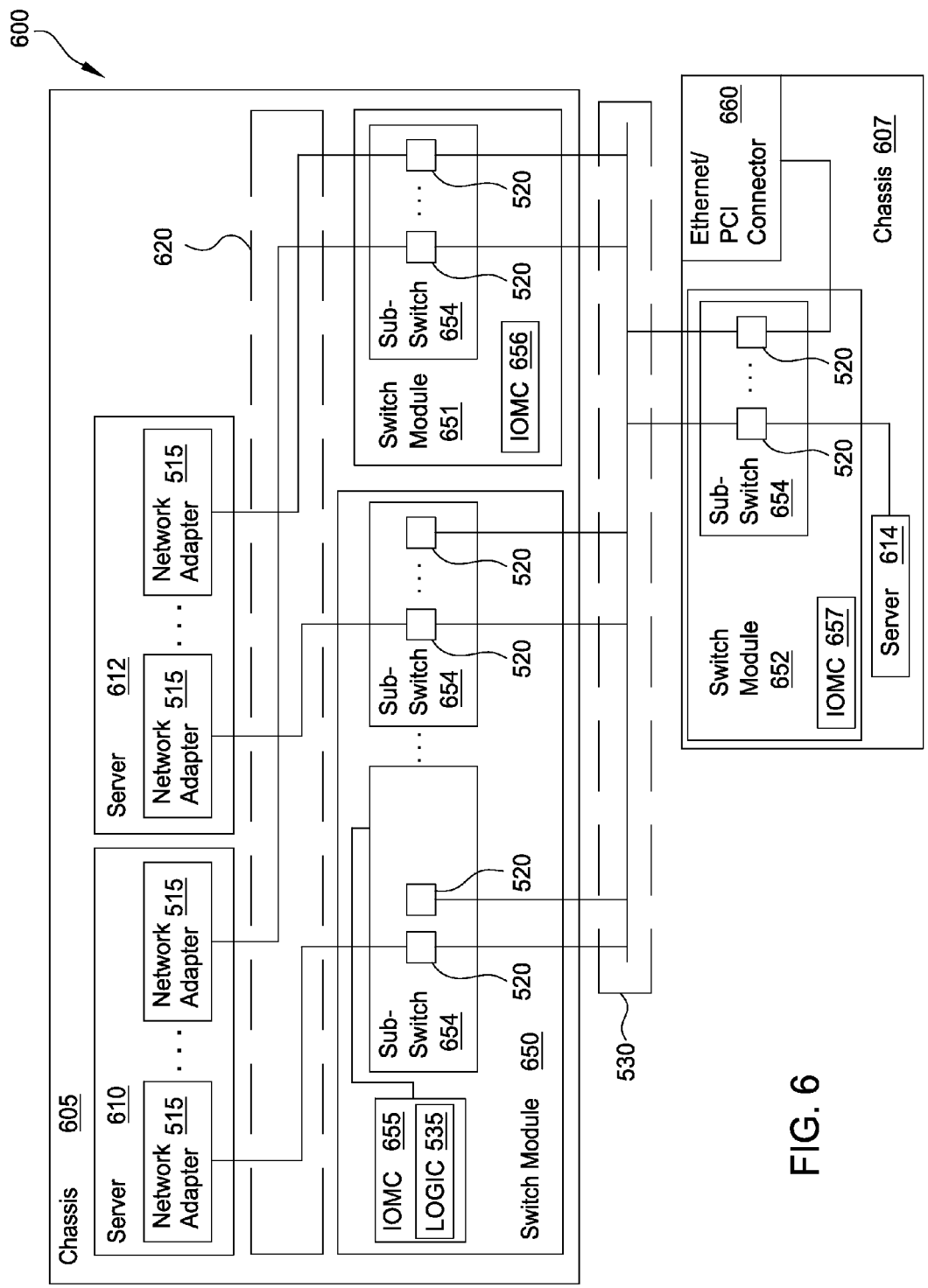
FIG. 6 illustrates the hardware representation of a system that implements a distributed, virtual switch, according to one embodiment described herein.

FIG. 6 illustrates a hardware representation of a system 600 that implements a distributed, virtual switch, according to one embodiment disclosed herein. Server 610 and 612 may be physically located in the same chassis 605; however, the chassis 605 may include any number of servers. The chassis 605 also includes a plurality of switch modules 650, 651 that include one or more sub-switches 654 (i.e., a microchip). In one embodiment, the switch modules 650, 651, 652 are hardware components (e.g., PCB boards, FPGA boards, etc.) that provide physical support and connectivity between the network adapters 515 and the bridge elements 520. In general, the switch modules 650, 651, 652 include hardware that connects different chassis 605, 607 and servers 610, 612, 614 in the system 600 and may be a single, replaceable part in the computing system.

The switch modules 650, 651, 652 (e.g., a chassis interconnect element) include one or more sub-switches 654 and an IOMC 655, 656, 657. The sub-switches 654 may include a logical or physical grouping of bridge elements 520—e.g., each sub-switch 654 may have five bridge elements 520. Each bridge element 520 may be physically connected to the servers 610, 612. For example, a bridge element 520 may route data sent using either Ethernet or PCI communication protocols to other bridge elements 520 attached to the switching layer 530 using the routing layer. However, in one embodiment, the bridge element 520 may not be needed to provide connectivity from the network adapter 515 to the switching layer 530 for PCI or PCIe communications.

Each switch module 650, 651, 652 includes an IOMC 655, 656, 657 for managing and configuring the different hardware resources in the system 600. In one embodiment, the respective IOMC for each switch module 650, 651, 652 may be responsible for configuring the hardware resources on the particular switch module. However, because the switch modules are interconnected using the switching layer 530, an IOMC on one switch module may manage hardware resources on a different switch module. As discussed above, the IOMCs 655, 656, 657 are attached to at least one sub-switch 654 (or bridge element 520) in each switch module 650, 651, 652 which enables each IOMC to route commands on the switching layer 530. For clarity, these connections for IOMCs 656 and 657 have been omitted. Moreover, switch modules 651, 652 may include multiple sub-switches 654.

As shown, the IOMC 655 has logic 535, which implements the above-described operations for concurrent repair of a sub-switch 654. The logic 535 is omitted from the IOMCs 656 and 657 for the sake of clarity, as each IOMC 656 and 657 may have its own logic 535. Furthermore, each IOMC 655, 656, 657 may execute its respective logic 535 to vary on and off a sub-switch of a different switch module. Generally, the logic 535 ensures that prior to removal of a sub-switch for repair, the switch hardware is reconfigured to remove all upstream to downstream connections utilizing the sub-switch. Once the sub-switch is powered back on, the logic 535 varies on the sub-switch in a way that reconfigures the switch hardware to add all upstream to downstream connections utilizing the sub-switch. The logic 535 implements a combination of in-band (PCI SHPC) as well as out-of-band (IMM IPMI) protocols to communicate with hardware elements of the distributed switch.

The dotted line in chassis 605 defines the midplane 620 between the servers 610, 612 and the switch modules 650, 651. That is, the midplane 620 includes the data paths (e.g., conductive wires or traces) that transmit data between the network adapters 515 and the sub-switches 654.

Each bridge element 520 connects to the switching layer 530 via the routing layer. In addition, a bridge element 520 may also connect to a network adapter 515 or an uplink. As used herein, an uplink port of a bridge element 520 provides a service that expands the connectivity or capabilities of the system 600. As shown in chassis 607, one bridge element 520 includes a connection to an Ethernet or PCI connector 660. For Ethernet communication, the connector 660 may provide the system 600 with access to a LAN or WAN (e.g., the Internet). Alternatively, the port connector 660 may connect the system to a PCIe expansion slot—e.g., PCIe device 550. The device 550 may be additional storage or memory which each server 610, 612, 614 may access via the switching layer 530. Advantageously, the system 600 provides access to a switching layer 530 that has network devices that are compatible with at least two different communication methods.

As shown, a server 610, 612, 614 may have a plurality of network adapters 515. This provides redundancy if one of these adapters 515 fails. Additionally, each adapter 515 may be attached via the midplane 620 to a different switch module 650, 651, 652. As illustrated, one adapter of server 610 is communicatively coupled to a bridge element 520 located in switch module 650 while the other adapter is connected to a bridge element 520 in switch module 651. If one of the switch modules 650, 651 fails, the server 610 is still able to access the switching layer 530 via the other switching module. The failed switch module may then be replaced (e.g., hot-swapped) which causes the IOMCs 655, 656, 657 and bridge elements 520 to update the routing tables and lookup tables to include the hardware elements on the new switching module.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product to repair switch units in a distributed switch comprising a plurality of switch units, each switch unit of the plurality having at least one port for establishing connections according to a predefined interface, the computer program product comprising:

a non-transitory computer readable storage medium having computer-readable program code embodied therewith, the computer-readable program code comprising:

computer-readable program code configured to, responsive to receiving an indication to vary off a first switch unit of the plurality of switch units:

identify a host connected to the first switch unit;
transmit a first removal indication to the host to remove a connection between the host and the first switch unit; and
upon determining that: (i) the host is connected to the first switch unit through a downstream port of the first switch unit and (ii) the host has not acknowledged the first removal indication within a predefined amount of time, transmitting a second removal indication by operation of one or more computer processors when executing the computer-readable program code, wherein the second removal indication emulates that the first switch unit is physically removed from the distributed switch, wherein the first switch unit is not physically removed from the distributed switch; and
computer-readable program code configured to, responsive to receiving an indication to vary on the first switch unit:
transmit an add indication to the host to establish a connection between the host and the first switch unit.

2. The computer program product of claim 1, wherein the predefined interface is a Peripheral Component Interconnect (PCI) Express interface, wherein the second removal indication is a PCIe standard hot plug controller (SHPC) manual retention latch (MRL) open command.

3. The computer program product of claim 2, wherein the host is connected to a second switch unit, wherein an upstream port of the second switch unit is connected to the downstream port of the first switch unit, wherein the first removal indication is an SHPC attention command, wherein the computer-readable program code configured to transmit the add indication comprises:
computer-readable program code configured to transmit, to the host, an SHPC MRL closed command emulating that the first switch element is connected to the switch fabric; and
computer-readable program code configured to transmit, to the host, an SHPC attention command indicating that the host create a connection to the first switch element.

4. The computer program product of claim 1, wherein the first switch unit is connected to the host through an upstream port of the first switch unit, wherein the first removal indication is an out-of-band hot plug remove command, wherein the add indication is an out-of-band hot plug add command, wherein the computer-readable program code further comprises:
computer-readable program code configured to, upon determining that the host has not acknowledged the first removal indication within a predefined amount of time, abort the operation to vary off the first switch unit.

5. The computer program product of claim 4, wherein the operation to vary off the first switch unit is not aborted if a force vary off indication is provided with the indication to vary off the first switch unit, wherein the force vary off indication varies off the first switch unit even if the host does not acknowledge the first removal indication.

6. The computer program product of claim 1, wherein the first removal indication and the second removal indication reconfigure the plurality of switch units to remove existing connections between a respective upstream port of each of the plurality of switch units and the downstream port of the first switch unit.

7. The computer program product of claim 6, wherein the add indication operates to restore the removed connections between the respective upstream port of each of the plurality of switch units and the downstream port of the first switch unit.

8. A system to repair switch units in a distributed switch comprising a plurality of switch units, each switch unit of the plurality having at least one port for establishing connections according to a predefined interface, the system comprising:
one or more computer processors; and
a memory containing a program, which, when executed by the one or more computer processors, performs an operation comprising:
responsive to receiving an indication to vary off a first switch unit of the plurality of switch units:
identifying a host connected to the first switch unit;
transmitting a first removal indication to the host to remove a connection between the host and the first switch unit; and
upon determining that: (i) the host is connected to the first switch unit through a downstream port of the first switch unit and (ii) the host has not acknowledged the first removal indication within a predefined amount of time, transmitting a second removal indication, wherein the second removal indication emulates that the first switch unit is physically removed from the distributed switch, wherein the first switch unit is not physically removed from the distributed switch; and
responsive to receiving an indication to vary on the first switch unit:
transmitting an add indication to the host to establish a connection between the host and the first switch unit.

9. The system of claim 8, wherein the predefined interface is a Peripheral Component Interconnect (PCI) Express interface, wherein the second removal indication is a PCIe standard hot plug controller (SHPC) manual retention latch (MRL) open command.

10. The system of claim 7, wherein the host is connected to a second switch unit, wherein an upstream port of the second switch unit is connected to the downstream port of the first switch unit, wherein the first removal indication is an SHPC attention command, wherein transmitting the add indication comprises:
transmitting, to the host, an SHPC MRL closed command emulating that the first switch element is connected to the switch fabric; and
transmitting, to the host, an SHPC attention command indicating that the host create a connection to the first switch element.

11. The system of claim 10, wherein the first switch unit is connected to the host through an upstream port of the first switch unit, wherein the first removal indication is an out-of-band hot plug remove command, wherein the add indication is an out-of-band hot plug add command.

12. The system of claim 11, wherein the operation further comprises:
upon determining that: (i) the host has not acknowledged the first removal indication within a predefined amount of time, and (ii) a force vary off indication is provided with the indication to vary off the first switch unit, wherein the force vary off indication varies off the first switch unit even if the host does not acknowledge the first removal indication, aborting the operation to vary off the first switch unit.

13. The system of claim 8, wherein the first removal indication and the second removal indication reconfigure the plurality of switch units to remove existing connections between a respective upstream port of each of the plurality of switch units and the downstream port of the first switch unit, wherein the add indication operates to restore the removed connections between the respective upstream port of each of the plurality of switch units and the downstream port of the first switch unit.

* * * * *